United States Patent Office 3,578,698
Patented May 11, 1971

3,578,698
PREPARATION OF ESTERS FROM OLEFINS IN THE PRESENCE OF AN OXIME
Percy Hayden, Norton-on-Tees, England, assignor to Imperial Chemical Industries Limited, London, England
No Drawing. Filed Dec. 15, 1966, Ser. No. 601,868
Claims priority, application Great Britain, Dec. 24, 1965, 54,840/65; May 5, 1966, 19,853/66; Dec. 24, 1966, 28,201/66
Int. Cl. C07c *67/04*
U.S. Cl. 260—475        18 Claims

ABSTRACT OF THE DISCLOSURE

There is provided a process for the oxidation of an unsaturated organic compound in the presence of a palladium catalyst and a nucleophilic compound. The oxidation is carried out in the presence of an oxime or in a solution to which has been added a nitrate, nitrite, nitrosyl, nitro or nitroso compound. The reaction is thus accomplished in the essential absence of halide ions.

---

The present invention relates to the oxidation of unsaturated organic compounds.

In the following British patent specifications we have disclosed processes for the oxidation of unsaturated organic compounds using palladium compounds as catalysts. In such processes it is preferred to have a redox system such as a copper salt and molecular oxygen present.

Thus in British patent specification No. 964,001 we describe and claim the production of carboxylic esters of unsaturated alcohols by contacting an alpha-olefine with a palladium salt, either under substantially anhydrous conditions or in the presence of a minor amount of water as defined, and in the presence of a carboxylic acid, carboxylate ions, a redox system and molecular oxygen.

In British patent specification No. 6,092/64 which corresponds to U.S. Ser. No. 431,997 we describe and claim a process in which allyl acetate is produced by contacting propylene with a palladium salt in the presence of acetic acid, the acetate of an alkali metal or of an alkaline earth metal or of copper and molecular oxygen and a copper salt, either under anhydrous conditions or in the presence of a quantity of water not exceeding 20% based on the total weight of acetic acid and water, and in the absence of halide ions in concentrations greater than 0.2 molar, the concentration of the acetate being at least 0.2 molar.

In British patent specification No. 6,093/64 which corresponds to U.S. Ser. No. 431,998, we describe and claim a process whereby certain unsaturated compounds are oxidised in the presence of a palladium salt, an aliphatic carboxylic acid containing between 2 and 10 carbon atoms and a salt of copper or iron (a redox system). Up to 20% water, and chloride or bromide ions may be present. Allyl acetate and allyl alcohol are exemplified as suitable starting materials in which case the oxidised products comprise acrolein, acrylic acid and allylidene diacetate.

In British patent specification No. 987,278 we describe and claim a process for the production of esters which comprises the step of reacting a compound having the structure $R.CH=CH.CH(R^1)X$ in which R is hydrogen or alkyl, $R^1$ is hydrogen or alkyl and X is chloride or acyloxy, at a temperature not exceeding 200° C. with a solution containing a carboxylic acid, a palladous salt, a cupric salt, a metal halide other than a fluoride, and less than 25% by weight of water. When $R.CH=CH.CH(R^1)X$ is allyl acetate, acetate esters of glycerol may be produced.

In British patent specification No. 1,027,396 we describe and claim a process which comprises the step of contacting an olefinic hydrocarbon at a partial pressure of at most 10 atmospheres with a solution containing a carboxylic acid, an ionised carboxylate and a palladous salt, to produce an ester-containing product corresponding to the acid used having a total content of mono-esters and di-esters of glycols of at least 30 molar percent based on the total amount of organic compounds produced, the reaction being carried out in the presence of a redox system, molecular oxygen, less than 15% by weight of water and an alkali metal halide so that, assuming complete ionisation, the halide:palladous gram ion ratio is greater than 6:1 and the halide:carboxylate gram ion ratio is at least 6:10.

In British patent specification No. 993,066 we describe and claim a process for the production of methallyl esters of carboxylic acids which comprises the step of contacting isobutene with a palladium salt and a carboxylate which is ionised under the reaction conditions in a carboxylic acid which is maintained at a temperature greater than 100° C. and at most 200° C.

In British patent specification No. 40,420/63 which corresponds to 402,939 now abandoned we describe and claim a process for the production of alkyl-alkenyl esters which comprises the step of contacting a terminal olefine with a substantially anhydrous solution of a palladium compound, the said solution containing an alcohol, and removing the ether from the reaction zone immediately upon formation.

We have now found that processes in which an unsaturated organic compound is oxidised using a palladium catalyst are advantageously carried out in the presence of an oxime or in a solution to which has been added a nitrate, nitrite, nitrosyl, nitro or nitroso compound.

Thus according to a first embodiment of the present invention a process for the oxidation of unsaturated organic compounds comprises contacting the unsaturated compound with a nucleophilic compound HA in the presence of a salt or co-ordination compound of palladium and an oxime.

In the nucleophilic compound HA H is hydrogen and A a nucleophilic element or group. Useful nucleophilic compounds are water, aliphatic and aromatic alcohols e.g. methanol, isobutanol, lauryl alcohol and benzyl alcohol and phenols. Thus when the unsaturated compound is an α-olefine and water is the nucleophilic compound, aldehydes or ketones are formed e.g. ethylene gives acetaldehyde and propylene acetone. If the unsaturated compound is ethylene and the nucleophilic compound is an alcohol vinyl ethers and acetals are obtained e.g. methanol and ethylene give methyl vinyl ether and dimethyl acetal by the process of the present invention. Preferred nucleophilic compounds are carboxylic acids which when an α-olefine is the unsaturated compound give unsaturated esters e.g. ethylene and propylene and acetic acid give vinyl acetate and allyl acetate respectively.

When a carboxylic acid is used in the process it is preferred that the water concentration of the reaction medium be less than 25% and that carboxylate ions be present additional to any derived from self-ionisation of the carboxylic acid.

The unsaturated organic compound may be an olefinic or aromatic compound. Thus benzene compounds may be oxidised by the process of the present invention and when acetic acid for example is the nucleophilic compound phenyl acetate and benzyl acetate are obtained from benzene and toluene respectively.

It is greatly preferred to carry out this form of the invention in the presence of a redox system which re-oxidses the reduced form of the salt or co-ordination compound of palladium. The redox system may itself be re-oxidised by the use of molecular oxygen in the process.

The oxidation of unsaturated compounds by palladium salts as illustrated by the processes described in the specifications referred to above is often dependent for efficient operation on the presence of halide ions. Disadvantages attendant on the use of halide ions however is their corrosive effect on ferrous metals, especially on stainless steel, and the production of chlorinated organic by-products. One of the advantages of the use of an oxime is that the concentration of halide ions may be reduced or halide ions omitted altogether without losing the advantages conferred by halide ions such as high reaction rate.

Low halide concentration processes are particularly important for the type of process described in British patent specifications Nos. 964,001, 6092/64 which corresponds to U.S. Ser. No. 431,997, and 6093/64 which corresponds to U.S. Ser. No. 431,998, and especially those in which an alpha-olefine such as ethylene or propylene is reacted with a carboxylic acid such as acetic acid, or allyl acetate or allyl alcohol is converted to acrolein. By low halide concentration we mean halide ion concentrations of less than 0.05 gram ions per litre of solution.

The oxime which is used in the process has the structure

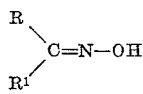

R and R¹ are hydrogen organic or inorganic groups. Preferred organic groups are hydrocarbon or substituted hydrocarbon groups which may be alkyl, cycloalkyl, alkenyl, cycloalkenyl, aryl, alkaryl, aralkyl or heterocyclic groups. R and R¹ may be the same or different or may form part of a cyclic structure as in cyclohexanone oxime. R and R¹ may also be substituted by non-hydrocarbon groups such as hydroxy groups. Preferably R and R¹ are alkyl or aryl groups or hydrogen. Thus R and R¹ may be alkyl groups containing up to 14 carbon atoms particularly containing up to 6 carbon atoms, for example methyl, ethyl propyl, n-butyl and iso-butyl. Particularly preferred oximes are formaldoxime, acetoxime and acetaldoxime. Benzaldoxime, acetophenone oxime, and benzophenone oxime may also be used. Dioximes, i.e. in which R or R¹ in the above formula is substituted by an oxime group may also be used, e.g. the dioxime of adipaldehyde, although it is preferred that the two oxime groups be separated by at least 3 carbon atoms. The oxime may be added as such or may be formed in situ e.g. by the addition of hydroxylamine to a solution containing an aldehyde or ketone. Preferably the concentration of the oxime is in the range 0.0001 to 1.0 molar, particularly in the range 0.001 to 0.1 molar.

According to a second embodiment of the invention a process for the oxidation of unsaturated compounds comprises contacting an olefinic compound and molecular oxygen with a solution comprising a palladous salt, a carboxylic acid, carboxylate ions additional to any provided by self-ionisation of the carboxylic acid, a redox system, up to 20% by weight of water and at most 0.05 gram ions of halide ions per litre of solution, to which solution has been added a nitrate, nitrite, nitrosyl, nitro- or nitroso-compound. When propylene is the olefinic hydrocarbon it is greatly preferred that the halide concentration is at most 0.03 gram ions per litre of solution.

The nitrate or nitrite may be an organic or an inorganic nitrate or nitrite and include nitrous and nitric acids, which may be added as such or their addition effected by adding the gaseous anhydride, i.e. nitric oxide or nitrogen dioxide. The nitrate or nitrite may be added to the solution as a nitrate or nitrite of one of the other inorganic components, for example as palladous nitrate or nitrite or a complex palladous salt such as diaminodinitritopalladium or where the redox system is an inorganic salt, as an inorganic nitrate or nitrite for example ferric nitrate or cupric nitrate. Other inorganic nitrates and nitrites may be used, such as the alkali metal nitrates and nitrites, particularly lithium, sodium and potassium nitrates; alkaline earth metal nitrates or nitrites, particularly magnesium, calcium and barium nitrates; nitrates or nitrites of the metals of Group VIII of the Periodic Table, for example cobalt, nickel, ruthenium, platinum and rhodium nitrates. Nitrates and nitrites of manganese, silver and gold may also be used. Esters of nitrous and nitric acid which may be used in the present process include alkyl nitrates and nitrites such as ethyl nitrite and propyl nitrate. Both aliphatic and aromatic nitro- and nitroso-compounds may be added in the process, for example nitroparaffins such as nitromethane and nitropropane, nitro-olefines, particularly nitro-olefins corresponding to an olefine used in the process, e.g. a nitropropylene when propylene is the olefinic hydrocarbon used. Suitable aromatic nitro- and nitroso-compounds include nitrobenzene and nitrosobenzene. Oximes, which may be regarded as nitroso-derivatives, may also be used in the process. Reaction products of olefines, e.g. ethylene and propylene, with oxides of nitrogen such as nitrogen dioxide are particularly suitable nitro-compounds, such products including mixtures of dinitrocompounds, nitro-olefines, nitrosites and nitrosates and nitro-oximes and furazane oxides (the isomerisation and dehydration product of nitro-oximes). Certain nitrosyls, e.g. complexes of metals such as palladium and copper containing nitroso-groups may conveniently be employed as a source of at least part of two of the reactants of the process. For example, complexes of formula $NOCuCl_2$ and $Pd(NO)_2Cl_2$ may be used providing that the halogen ions also introduced do not exceed the stipulated maximum concentration. In general, nitric acid or an alkali metal nitrate, particularly lithium nitrate, are preferred additives in the process.

A single nitrate, nitrite, nitrosyl, nitro- or nitroso-compound may be added, or two or more such compounds may be added. The addition may be continuous but is preferably batchwise even in a continuous reaction as there tends to be an initial decrease in rate when the nitrogen compound is added which soon increases again however. The compound or compounds may advantageously be added in such an amount as to give rise to an increase of up to 1.0 gram atom of nitrogen per litre of solution, preferably 0.05 to 0.5 gram atom of nitrogen per litre of solution more preferably 0.05 to 0.3 gram atom of nitrogen per litre.

In general when using the catalyst system of the present process the initial rate of reaction tends to be low, but to rise after 3 to 12 hours. This higher rate may then be maintained for a long period. The period during which the initial rate is low may be reduced by using a high initial concentration of palladous salt e.g. a concentration of at least 0.01 molar. A catalyst system which has been once used retains its high activity in subsequent reactions, even when a different olefinic compound is used.

In both the embodiments described above it is preferred that the halide ion concentration be less than 0.01 gram ions per litre of solution. In particular to reduce the corrosive effect to a minimum it is preferred to work at halide ion concentrations of at most 0.0003 gram ions per litre of solution or, where possible, in the absence of halide. Chloride or bromide ions are the halide ions normally encountered in processes such as are described in British patent specifications Nos. 964,001, 6092/64 which corresponds to U.S. Ser. No. 431,997 and 6093/64 which corresponds to U.S. Ser. No. 431,998 and its chloride ions which are particularly deleterious A redox system used in the process of the present invention may be organic or inorganic in nature. For example, if it is preferred to use an organic redox system, para-benzoquinone, duroquinone and 2-ethylanthroquinone are suitable. If, on the other hand it is preferred to use an inorganic redox system, copper salts are particularly suitable. For example, copper chloride or copper nitrate, or copper carboxylates e.g. copper acetate may be employed. Thus, in the production of an unsaturated acetate or of acrolein from allyl acetate or allyl alcohol, copper acetate may be used as the redox system. Other inorganic redox systems such as ferric salts, for example ferric chloride, may be used. It is also possible to employ organic and inorganic redox systems in conjunction; for example one of the quinones named above and a copper salt may be used conjointly. As yet another possibility, two organic or inorganic redox systems may be used together, for example a copper salt and a ferric salt. In particular the use of certain other inorganic redox systems in conjunction with a copper redox system as described in co-pending application No. 12,571/66 which corresponds to U.S. Ser. No. 622,430 is particularly applicable, for example, a cobalt salt and a copper salt. The redox system is preferably used in a concentration of at least 0.01 and preferably at least 0.1 molar, e.g. 0.1 to 0.5 molar.

The presence of molecular oxygen serves to re-oxidise the reduced form of the redox system. The re-oxidation may be carried out in situ or as a separate stage in a two stage process. The oxygen pressure may be up to 10 atmospheres and is preferably in excess of 0.1 atmosphere. It is also preferred when using a gaseous unsaturated compound and introducing this compound to the reaction medium in admixture with oxygen that the concentration of oxygen is below that at which the mixture is inflammable. Thus when the unsaturated compound is ethylene this concentration is 3 to 7% by volume. For gaseous unsaturated compounds such as ethylene and propylene the rate of introduction of such a gas mixture to the solution may conveniently be 100 to 3000 litres per litre of solution per hour, preferably about 1600 litres per litre of solution per hour.

A carboxylic acid used in the process may be an aliphatic or aromatic mono or dicarboxylic acid although it is preferred not to use dicarboxylic acids which complex strongly with metal ions. Examples of aliphatic monocarboxylic acids useful in the process are those containing up to 20 carbon atoms, particularly up to 12 carbon atoms, for example acetic acid, propionic acid and n-hexanoic acid. Adipic acid is a suitable aliphatic dicarboxylic acid and benzoic and the phthalic acids, especially terephthalic acid, are suitable aromatic mono- and dicarboxylic acids respectively. Carboxylate ions additional to any derived from self-ionisation of the carboxylic acid may be derived from any carboxylic acid, for example from an aliphatic or aromatic mono- or di--carboxylic acid. They are preferably derived from one of the acids mentioned in the preceding paragraph and more preferably are the same as the carboxylic acid used. The preferred concentration of carboxylate ions is generally in the range 0.5 to 4 molar although in the process described in British patent specifications Nos. 987,278 and 1,027,396 lower concentrations of carboxylate ions e.g. 0.5 to 1.0 molar may be used. The carboxylate ions may be introduced to the process in the form of an alkali metal or alkaline earth metal carboxylate, lithium and sodium carboxylates being particularly suitable, or may be formed in situ by reaction of an alkali metal or alkaline earth metal carbonate with the carboxylic acid.

When using a carboxylic acid in the process it is preferred that the water concentration in the reaction medium is less than 10% by weight or even lower e.g. less than 5% by weight. The process may generally however be operated satisfactorily when the water concentration lies in the range 5 to 15% by weight.

The salt or co-ordination compound of palladium for use in the process is suitably a palladous salt e.g. a palladous halide such as palladous chloride or palladous bromide. Palladous carboxylates e.g. palladous acetate are preferred particularly for use with a carboxylic acid when the palladous carboxylate may correspond to the carboxylic acid or carboxylate ions used. Other palladous salts which may be used include lithium chloropalladite and palladous nitrate. The co-ordination compounds of palladium which may be used in the process include dichlorobis-(benzonitrile) palladium II. The palladium salt may also be formed in situ by the use of metallic palladium. The concentration of the salt or co-ordination compound of palladium is preferably up to 0.1 molar more preferably in the range $10^{-5}$ to $10^{-2}$ molar.

Particularly useful olefinic compounds in the present process are alpha-olefines (i.e. olefines containing the grouping $-CH=CH_2$). The alpha-olefine may be an aliphatic alpha-olefine containing up to 20 carbon atoms or more, e.g. cracked wax alpha-olefines from a $C_{14}$ cut, or an aryl substituted alpha-olefine, e.g. styrene. Preferably the aliphatic alpha-olefine contains at most 12 carbon atoms, e.g. n-hexene-1, n-octene-1, or 3:5:5-trimethyl hexene-1; more preferably at most 4 carbon atoms, e.g. ethylene, propylene, n-butene-1 or isobutene. Non-terminal olefines containing 4 to 8 or more carbon atoms, such as n-octene-2, may also be used in the process as may di-olefines such as butadiene and substituted butadienes, for example piperylene. Other important olefinic compounds include olefinic acids, alcohols and esters; for example allyl acetate which by choice of reaction conditions as described in British patent specifications Nos. 987,278 and 1,027,396 can be oxidised to glyceryl esters or to acrolein respectively by the present process.

When a carboxylic acid is used the process may be carried out using an excess of the carboxylic acid as solvent, or an additional organic polar solvent may be used. Suitable solvents include amides such as acetamide and benzamide; substituted amides such as NN-dimethyl formamide, N-methyl acetamide and N,N-dimethylacetamide; nitriles such as acetonitrile and benzonitrile; sulphoxides such as the dialkyl sulphoxides, especially dimethyl sulphoxide; and sulphones such as sulpholane and the substituted sulpholanes. Aromatic and aliphatic nitro compounds which are known solvents may also be used, e.g. nitrobenzene or the nitroparaffins. An ester corresponding in the acid radical to the ester being produced may also be used (for example, when an unsaturated acetate is being produced, an acetate ester such as 1,1-diacetoxyethane or 1,2-diacetoxyethane may be used as solvent). The solvent may conveniently form 5-95% by weight of the reaction medium.

The concentration of the olefinic compound in the solution is preferably up to 5 molar. When the olefinic compound is gaseous, for example ethylene, this concentration may be achieved by the use of partial pressures of the olefinic compounds up to 200 atmospheres, although pressures in the range 2 to 60 atmospheres are preferred.

The process of the present invention may advantageously be carried out in the temperature range 50° to 200° C. preferably 100° to 130° C.

In one preferred form of the invention a gaseous olefine, for example ethylene or propylene, admixed with molecular oxygen is introduced into a solution of palladous acetate, an alkali metal acetate, copper acetate and formaldoxime or acetoxime in acetic acid. The pressure is in the range 5 to 100 atmospheres and the temperature in the range 100° to 130° C. The halide ion concentration of the solution is less than 0.05 gram ion per litre of solution and the water concentration 5 to 15% by weight of the solution. The unsaturated ester products of the reaction for example vinyl or allyl acetate are removed in the exit gas stream.

In another form of the invention a gaseous olefine, for example ethylene or propylene, admixed with molecular oxygen is introduced into a solution of palladous acetate, an alkali metal acetate, copper acetate and an alkali metal nitrate in acetic acid. The pressure is in the range of 5 to 100 atmospheres and the temperature in the range 100–130° C. The halide ion concentration of the solution is less than 0.05 gram ion per litre of solution and the water concentration less than 5% by weight of solution. The unsaturated ester products of the reaction are either removed in the exit gas stream for example in the case of a vinyl acetate, or are separated by distillation from the liquid product, for example in the case of octenyl acetate. Using these conditions when ethylene is the olefinic compound a vinyl acetate to acetaldehyde molar ratio of 10:1 or more may be obtained. This may be compared with a ratio of 2:1 when an equivalent reaction rate is achieved by use of chloride ions.

In a further form of the invention, a liquid olefinic compound is used, for example allyl acetate or allyl alcohol. In this case oxygen alone or oxygen admixed with an inert gas is introduced into the solution, other conditions preferably being the same as described in the last but one paragraph. The product of the reaction, including acrolein, is separated by fractional distillation.

The products of the process are useful as chemical intermediates and/or polymerisable monomers.

The invention will now be further described with reference to the following examples.

EXAMPLE 1

A gas mixture of propylene at a partial pressure of 386 p.s.i.g. and oxygen was passed continuously at a rate of 1600 litres per hour into a vessel containing acetic acid (1000 mls.) palladous acetate, lithium acetate (2.0 molar), copper acetate (0.2 molar) and water (2.5% weight volume) to which sodium nitrate had been added. The temperature was 120° C. and the halide ion concentration, present as impurities, was 0.0003 gram ions per litre. The rate of formation of the products was measured by gas/liquid chromatography.

The results are given in the following table.

In Example 1 after three hours the ratio of products formed was greater than 18:1.

Comparison of Examples 2 and 3 shows that solutions to which nitrate has been added give a much greater rate of product formation than solutions to which nitrate ions have not been added.

Example 4 shows that the higher concentrations of nitrate give excellent rates of product formation and good product distribution.

Example 5 shows that even at low concentrations of copper acetate the rates of product formation are still good.

EXAMPLES 8 TO 10.—OXIDATION OF PROPYLENE

A gas mixture of propylene (96%) and oxygen (4%) at a total pressure of 400 p.s.i.g. was passed continuously at a rate of 1600 litres per hour into a vessel containing the reaction mixtures tabulated below. The temperature was 120° C., halide ions were present only as impurities and the stationary state water concentration of the reaction mixtures was 2–3% by weight. The rates of product formation were measured by gas/liquid chromatography and are shown for each solution.

| Oxygen partial pressure, p.s.i.g. | Palladous acetate concentration | Sodium nitrate added to give a nitrogen concentration of— | Rate of formation of products (moles/liter/hour) | | |
|---|---|---|---|---|---|
| | | | Allyl acetate | Acetone | Isopropenyl acetate |
| 16 | $10^{-2}$ molar | 0.1 gram atoms per litre | 0.4 | 0.07 | 0.03 |
| 8 | do | do | 0.2 | 0002 | 0.02 |
| 16 | $3 \times 10^{-3}$ | do | 0.3 | 0.02 | 0.02 |
| 16 | $10^{-2}$ molar | 0.3 gram atoms per litre | 0.1 | 0.01 | 0.01 |
| 16 | do | 0.05 gram atoms per litre | 0.2 | 0.03 | 0.01 |
| 16 | do | 0.15 gram atoms per litre | 0.5 | 0.07 | 0.03 |

EXAMPLE 2

The reaction conditions were the same as in Example 1 using ethylene instead of propylene with an oxygen partial pressure of 16 p.s.i.g. a palladous acetate concentration of $5 \times 10^{-3}$ molar, a water content of 2.8% weight/volume, and a halide concentration of 0.00045 gram ion per litre. The nitrogen concentration achieved by adding sodium nitrate was 0.15 gram atoms per litre.

Vinyl acetate was formed continuously at a rate of 0.5 mole/litre/hour and acetaldehyde at a rate of 0.05 mole/litre/hour i.e. a molar ratio of 10:1.

EXAMPLES 3–7

A gas mixture of ethylene (96%) and oxygen (4%) at a total pressure of 400 p.s.i.g. was passed continuously at a rate of 1600 litres per hour into a vessel containing the reaction mixture tabulated below. The temperature was 120° C., halide ions were present only as impurities and the stationary state water concentration of the reaction mixture was 2 to 3% by weight. The rates of formation of the products were measured by gas/liquid chromatography and are shown for each solution.

| Example No | 3 | 4 | 5 | 6 | 7 |
|---|---|---|---|---|---|
| Acetic acid, mls | 1,000 | 1,000 | 1,000 | 1,000 | 1,000 |
| Copper acetate, mole | 0.4 | 0.3 | 0.4 | 0.4 | 0.1 |
| Cobalous acetate, mole | 0.2 | 0.1 | 0.2 | 0.2 | 0.2 |
| Lithium acetate, mole | 2.0 | 2.0 | 2.0 | 2.0 | 1.0 |
| Lithium nitrate, mole | 0.2 | 0.0 | 0.2 | 0.5 | 0.2 |
| Palladous acetate, mole | 0.001 | 0.004 | 0.004 | 0.005 | 0.004 |

RATES OF PRODUCTION FORMATION (MOLES/LITRE/HOUR)

| Example No | 3 | 4 | 5 | 6 | 7 |
|---|---|---|---|---|---|
| Vinyl acetate | 0.18 | 0.25 | 1.0 | 0.9 | 0.8 |
| Acetaldehyde | <0.01 | 0.05 | 0.6 | 0.15 | 0.25 |
| Ratio of vinyl acetate to acetaldehyde | >18:1 | 5:1 | 1.7:1 | 6:1 | 3.2:1 |

| Example No | 8 | 9 | 10 |
|---|---|---|---|
| Acetic acid, mls | 1,000 | 1,000 | 1,000 |
| Copper acetate, mole | 0.4 | 0.1 | 0.2 |
| Cobalt acetate, mole | 0.2 | 0.2 | 0.0 |
| Lithium acetate, mole | 2.0 | 2.0 | 2.0 |
| Lithium nitrate, mole | 0.5 | 0.15 | 0.08 |
| Palladous acetate, mole | 0.04 | 0.007 | 0.01 |

RATES OF PRODUCT FORMATION (MOLES/LITRE/HOUR

| Example No | 8 | 9 | 10 |
|---|---|---|---|
| Allyl acetate | 0.24 | 0.18 | 0.22 |
| Isopropenyl acetate | 0.03 | 0.04 | 0.02 |
| Acetone | 0.04 | 0.06 | 0.06 |

EXAMPLE 11

A gas mixture of propylene (96%) and oxygen (4%) at a total pressure of 400 p.s.i.g. was passed continuously at a rate of 1600 litres per hour into a vessel containing:

Acetic acid—1000 mls.
Copper acetate—0.2 mole
Cobalt acetate—0.2 mole
Lithium acetate—2.0 mole
Sodium nitrite—0.15 mole
Palladous acetate—0.005 mole The temperature was 120° C., halide ions were present only as impurities and the stationary state water concentration of the reaction mixture was 2 to 3% by weight. The rate of formation of the products of the reaction was measured by gas/liquid chromatography.

After three hours the rate of formation of the products of the process was:

Moles/litre/hour
Allyl acetate _____ 0.14
Isopropenyl acetate _____ 0.01
Acetone _____ 0.01

EXAMPLE 12

Example 9 was repeated using a reaction medium comprising:
Acetic acid—1000 mls.
Copper acetate—0.2 mole
Cobalt acetate—0.2 mole
Lithium acetate—2.6 mole
Lithium nitrate—0.15 mole
Palladous acetate—0.018 mole After 17 hours a mixture comprising the following was added to the reaction medium:

| | Mole |
|---|---|
| Palladous acetate | 0.0004 |
| Copper acetate | 0.008 |
| Copper nitrate | 0.002 |
| Cobalt acetate | 0.01 |

The rates of production formation after 17 and 20 hours were:

| | 17 hours [1] | 20 hours |
|---|---|---|
| Allyl acetate | 0.38 | 0.72 |
| Isopropenyl acetate | 0.18 | 0.14 |
| Acetone | 0.28 | 0.22 |

[1] i.e. Before the above addition.

EXAMPLE 13

The reaction mixture was the same as in Example 11 and after 5 hours 0.005 mole of diaminodinitritopalladium suspended in acetic acid was added. The rate of formation of allyl acetate increase from 0.033 to 0.037 moles/litre/hour.

EXAMPLE 14

A gas mixture of propylene (67%) and oxygen (33%) was passed continuously at a rate of 20 litres per hour into a vessel containing:

Acetic acid—150 mls.
Copper acetate—0.26 molar
Lithium acetate—2.0 molar
Palladous acetate—0.05 molar
Para-dinitrobenzene—0.1 molar The total pressure was 1 atmosphere made up of the partial pressure of oxygen, propylene, acetic acid and reaction products. The propylene and oxygen partial pressures were 0.5 and 0.25 atmosphere respectively. The temperature was 90° C.

The rate of formation of the products was measured by gas/liquid chromatography. After 400 minutes the rate of formation of the products of the reaction was:

| | Moles/litre/hour |
|---|---|
| Allyl acetate | $2.1 \times 10^{-2}$ |
| Acetone | $0.4 \times 10^{-2}$ |
| Isopropenyl acetate | $0.1 \times 10^{-2}$ |

These figures may be compared with the reaction rates obtained when the same reaction was carried out in the absence of p-dinitrobenzene namely:

| | Moles/litre/hour |
|---|---|
| Allyl acetate | $1.7 \times 10^{-2}$ |
| Acetone | $0.6 \times 10^{-2}$ |
| Isopropenyl acetate | $0.1 \times 10^{-2}$ |

EXAMPLES 15–18

In these examples a gas mixture containing 66.5% propylene acid and 33.5% oxygen was continuously introduced into the catalyst solution comprising water and acetic acid. The temperature was 90° C. and the pressure 1 atmosphere. The products of the process were removed in the exit gas stream and measured chromatographically. Reaction conditions and product yields are given in the following table.

| Example | Water, mls. | Acetic acid, mls. | Gas velocity, l./hrs. | Catalyst solution, molar | | | Oxime | Time of reaction, hours | Products, moles/litre/hour | | |
|---|---|---|---|---|---|---|---|---|---|---|---|
| | | | | Palladous acetate | Lithium acetate | Copper acetate | | | Allyl acetate | Acetone | Isopropenyl acetate |
| 15 | 1 | 99 | 45 | .03 | 2.0 | 0.2 | Acetoxime .03 molar | 5 | 0.18 | 0.05 | .02 |
| 16 | 20 | 80 | 45 | .014 | 2.0 | 0.2 | Formaldoxime .014 molar | 2 | 0.05 | 0.12 | .02 |
| 17 | 5 | 95 | 30 | .015 | 0.1 | 0.2 | Formaldoxime .011 molar | 2 | 0.02 | 0.07 | .01 |
| 18 | 5 | 95 | 30 | .012 | | 0.2 | Formaldoxime .023 molar | 3 | 0.01 | 0.06 | .01 |

It will be noted that as the concentration of water rises in Example 16, the concentration of acetone increases in the reaction products.

EXAMPLES 19–22

In these examples a gas mixture containing 96% ethylene and 4% oxygen was continuously introduced into a catalyst solution comprising 50 mls. water and 950 mls. acetic acid in which was dissolved:

| | Mole/litre |
|---|---|
| Palladous acetate | 0.0005 |
| Lithium acetate | 1.5 |
| Copper acetate | 0.3 |

The catalyst solution also contained an oxime as described in the following table, and an hourly addition of oxime and palladous salt was made throughout the experiments. The temperature was 135° C., the pressure 400 p.s.i.g. and the duration of the reaction 24 hours. The products were estimated chromatographically the yields being given in the table.

| Example | Oxime | Oxime concentration (molar) | Rate of addition, moles/litre/per hour of— | | Products moles/litre/hour | |
|---|---|---|---|---|---|---|
| | | | Palladous acetate | Oxime | Vinyl acetate | Acetaldehyde |
| 19 | Acetoxime | 0.002 | 0.0002 | 0.0005 | 1.0 | 0.6 |
| 20 | do | 0.004 | 0.0002 | 0.001 | 1.1 | 0.7 |
| 21 | Acetaldehyde oxime | 0.0005 | 0.0002 | 0.0002 | 1.2 | 0.7 |
| 22 | Formaldoxime | 0.001 | 0.0002 | 0.0002 | 1.0 | 0.7 |

In all the above examples acetoxime is the oxime derived from acetone, formaldoxime the oxime derived from formaldehyde and acetaldehyde oxime the oxime derived from acetaldehyde. The formaldoxime was added as the monomer although the trimer could have been used.

EXAMPLE 23

Allyl alcohol contained in a gas stream of oxygen was gradually admitted to the following catalyst solution over a period of 5 hours:

Catalyst:
    Palladous acetate—0.01 mole/litre
    Acetoxime—0.05 mole/litre
    Lithium acetate—2.0 mole/litre
    Copper acetate—0.2 mole/litre
    Acetic acid—150 mls.
Temperature—90° C.
Oxygen gas rate—45 litres per hour
Time—5 hours Allyl alcohol IN—0.270 mole/litre/hour
Allyl alcohol OUT—0.006 mole/litre/hour
Allyl alcohol consumed—0.264 mole/litre/hour
Acrolein made by oxidation—0.210 mole/litre/hour
Allyl acetate made by
 esterification—0.010 mole/litre/hour

EXAMPLE 24

Allyl alcohol contained in a gas stream of air was gradually admitted to the following catalyst solution over a period of 7 hours:

Catalyst:
 Palladous acetate—.01 mole/litre
 Acetoxime—.05 mole/litre
 Lithium acetate—2.0 moles/litre
 Copper acetate—0.4 mole/litre
 Cobalt acetate—0.2 mole/litre
 Acetic acid—150 mls.
Temperature—90° C.
Air gas rate—45 litres per hour
Time—7 hours
 Allyl alcohol IN—0.150 mole/litre/hour
 Allyl alcohol OUT—0.006 mole/litre/hour
 Allyl alcohol consumed—0.144 mole/litre/hour
 Acrolein made—0.129 mole/litre/hour
 Allyl acetate made—0.014 mole/litre/hour

EXAMPLE 25

Allyl acetate contained in a gas stream of oxygen was gradually admitted to the following catalyst solution over a period of 8 hours:

Catalyst:
 Palladous acetate—.05 mole/litre
 Acetoxime—.1 mole/litre
 Lithium acetate—2.0 moles/litre
 Copper acetate—0.2 mole/litre
 Acetic acid—115 mls.
 Allyl acetate—30 mls.
Temperature—90° C.
Gas rate (oxygen)—10 litres per hour
Time—8 hours
 Allyl acetate consumed—0.113 mol/litre/hour
 Allylidene diacetate—0.033 mole/litre/hour
 Acrolein—0.012 mole/litre/hour
 Cis-1:3 diacetoxy propene—0.009 mole/litre/hour
 Trans-1:3 diacetoxy propene—0.013 mole/litre/hour As the experiment proceeded the make of the 1:3 diacetoxy propene eventually stopped, and the yield of allyl product i.e. acrolein plus allylidene diacetate rose to 70%.

EXAMPLE 26

A mixture of ethylene (96%) and oxygen (4%) at a total pressure of 425 p.s.i.g. was passed continuously at a rate of 1500 litres per hour into a vessel containing:

Acetic acid—1000 mls.
Copper acetate—0.2 mole/litre
Cobalt acetate—0.1 mole/litre
Lithium acetate—1.0 mole/litre
Lithium nitrate—0.2 mole/litre
Palladous acetate—0.005 mole/litre The temperature was 120° C. Additional palladous acetate was added at a rate of 0.0012 mole/litre/hour and 0.2 mole of lithium nitrate was added after 80 hours.

The average output of product over 240 hours was:

| | Mole/litre/hour |
|---|---|
| Vinyl acetate | 1.0 |
| Acetaldehyde | 0.4 |

EXAMPLE 27

A mixture of propylene (96%) and oxygen (4%) at a total pressure of 400 p.s.i.g. was passed continuously at a rate of 1600 litres per hour into a vessel containing:

Acetic acid—1000 mls.
Copper acetate—0.2 mole/litre
Cobalt acetate—0.05 mole/litre
Lithium acetate—2.0 moles/litre
Acetaldoxime—0.025 mole/litre
Palladous acetate—0.01 mole/litre The temperature was 130° C.
The rate of make of product was:

| | Mole/litre/hour |
|---|---|
| Allyl acetate | 0.15 |
| Acetone | 0.05 |
| Isopropenyl acetate | 0.03 |

EXAMPLE 28

Oxygen was passed through a solution of octene-1 (1.3 moles/litre) in acetic acid in which was also dissolved:

| | Mole/litre |
|---|---|
| Palladous acetate | 0.05 |
| Acetoxime | 0.05 |
| Cupric acetate | 0.2 |
| Lithium acetate | 0.2 |

The mixture was maintained at 100° C. for 3 hours and the product was then extracted and distilled at 65°–75° C. at 6 mm. 6 moles of octenyl acetate were obtained per mole of palladium and 80% of the palladium remained in solution at the termination of the reaction.

In an identical experiment in which the acetoxime was omitted only 2 moles of ester per mole of palladium was produced and no palladium remained in solution at the end of the experiment.

I claim:
1. In a process for the oxidation of an olefinic hydrocarbon in the presence of a hydrocarbon carboxylic acid, a redox system, molecular oxygen and up to 0.1 molar concentration of palladium compound at a temperature in the range 50° to 200° C., the improvement which comprises carrying out the oxidation in the essential absence of halide ions and in the presence of up to one molar concentration of an oxime selected from the group consisting of cyclohexanone oxime, benzaldoxime, acetophenone oxime, benzophenone oxime and the dioxime of adipaldehyde and an oxime of the formula

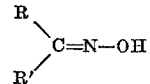

in which R and R' which may be the same or different are selected from the group consisting of alkyl of up to 14 carbon atoms and hydrogen.

2. The process of claim 1 in which the concentration of the oxime is 0.0001 to 1.0 molar.

3. The process of claim 2 in which the oxime is selected from the group consisting of formaldoxime, acetoxime, acetaldoxime, benzaldoxime, acetophenone oxime and benzophenone oxime.

4. The process of claim 1 in which the redox system is a copper or iron salt.

5. The process of claim 4 in which a copper salt redox system is used in conjunction with another inorganic redox system.

6. The process of claim 1 in which the reaction medium contains carboxylic ions additional to any derived from self-ionisation of the carboxylic acid.

7. The process of claim 6 in which the carboxylic acid is an aliphatic or aromatic mono or dicarboxylic acid.

8. The process of claim 7 in which the carboxylic ions correspond to the carboxylic acid used in the process and are introduced to the process as an alkali metal or alkaline earth metal carboxylate.

9. The process of claim 1 in which the halide ion concentration in the reaction medium is less than 0.05 gram ions per litre.

10. The process of claim 9 in which the palladium catalyst is a palladium carboxylate.

11. The process of claim 1 in which the water concentration in the reaction medium is less than 25% by weight.

12. The process of claim 6 in which an organic polar solvent is present.

13. The process of claim 1 in which the carboxylic acid is an aliphatic monocarboxylic or dicarboxylic acid containing up to 20 carbon atoms or an aromatic mono or dicarboxylic acid.

14. The process of claim 1 in which the palladous salt is a palladous halide or palladous carboxylate.

15. The process of claim 1 in which the reaction medium comprises 5 to 95% by weight of an organic polar solvent selected from the group consisting of amides, substituted amides, nitriles, sulphoxides, sulphones, aromatic or aliphatic nitro compounds and esters corresponding in the acid radical to unsaturated esters produced in the process.

16. The process in which ethylene or propylene and molecular oxygen are contacted with a solution comprising:

(a) an aliphatic monocarboxylic acid containing up to 12 carbon atoms,
(b) a lithium or sodium carboxylate corresponding to the carboxylic acid in a concentration in the range 0.5 to 4 molar,
(c) a copper carboxylate,
(d) less than 10% by weight water,
(e) less than 0.01 gram ions per litre halide ions,
(f) a palladous carboxylate in a concentration in the range $10^{-5}$ to 0.1 molar, and
(g) formaldoxime, acetoxime or acetaldoxime, at a temperature in the range 50° to 200° C. and at a partial pressure of the ethylene or propylene in the range 2 to 60 atmospheres.

17. The process of claim 16 in which a cobalt salt is present.

18. The process of claim 13 wherein the acid is selected from the group consisting of benzoic, phthalic and terephthalic acids.

References Cited

UNITED STATES PATENTS

| | | | |
|---|---|---|---|
| 3,221,045 | 11/1965 | McKeon et al. | 260—497 |
| 3,277,158 | 10/1966 | Schaeffer | 260—497 |
| 3,285,970 | 11/1966 | Schaeffer | 260—497 |
| 3,346,623 | 10/1967 | Young | 260—497 |

FOREIGN PATENTS

| | | | |
|---|---|---|---|
| 969,017 | 9/1964 | Great Britain | 260—497 |
| 1,364,483 | 5/1964 | France | 260—597 |
| 1,523,314 | 11/1965 | France | 260—614 |

LORRAINE A. WEINBERGER, Primary Examiner

V. GARNER, Assistant Examiner

U.S. Cl. X.R.

252—416; 260—410.9, 476, 479, 485, 488, 491, 497, 531, 597, 601, 603, 604, 611, 612, 614, 615